United States Patent [19]

Doescher et al.

[11] Patent Number: 4,993,279

[45] Date of Patent: Feb. 19, 1991

[54] TILT STEERING COLUMN LATCH RELEASE

[75] Inventors: Robert D. Doescher, Bolingbrook; Roger L. Anliker, Plainfield, both of Ill.

[73] Assignee: J.I. Case Company, Racine, Wis.

[21] Appl. No.: 385,742

[22] Filed: Jul. 27, 1989

[51] Int. Cl.$^5$ ............................................. B62D 1/18
[52] U.S. Cl. ........................................ 74/493; 74/526; 74/535; 280/775
[58] Field of Search .................... 74/493, 526, 535; 280/775

[56] References Cited

U.S. PATENT DOCUMENTS

| | | | |
|---|---|---|---|
| 2,865,222 | 12/1958 | Bachman | 74/493 |
| 3,555,924 | 1/1971 | Scheffler, Jr. | 74/493 |
| 3,799,569 | 3/1974 | Baker | 74/493 X |
| 4,033,158 | 7/1977 | Chamberlain et al. | 74/493 X |
| 4,291,896 | 9/1981 | Koch | 74/493 X |
| 4,527,444 | 7/1985 | McKee et al. | 74/493 |
| 4,706,776 | 11/1987 | Hyoki et al. | 74/493 X |

*Primary Examiner*—Allan D. Herrmann
*Attorney, Agent, or Firm*—Dykema Gossett

[57] ABSTRACT

A tilt steering wheel assembly has a steering column that may be pivoted to a variety of tilt positions for adjusting the steering wheel to the comfort of an operator of a motor vehicle. The range of adjusted positions is limited between comfortable driving positions. A latch lever is provided for releasing the steering wheel from one of the adjusted positions so that it may be tilted to another of the adjusted positions. The lever is limited in its rotatable travel to limit the range of adjustable positions, but may be released from this limitation so that the steering column and steering wheel may be tilted to an extreme position for servicing components connected to the steering column.

4 Claims, 3 Drawing Sheets

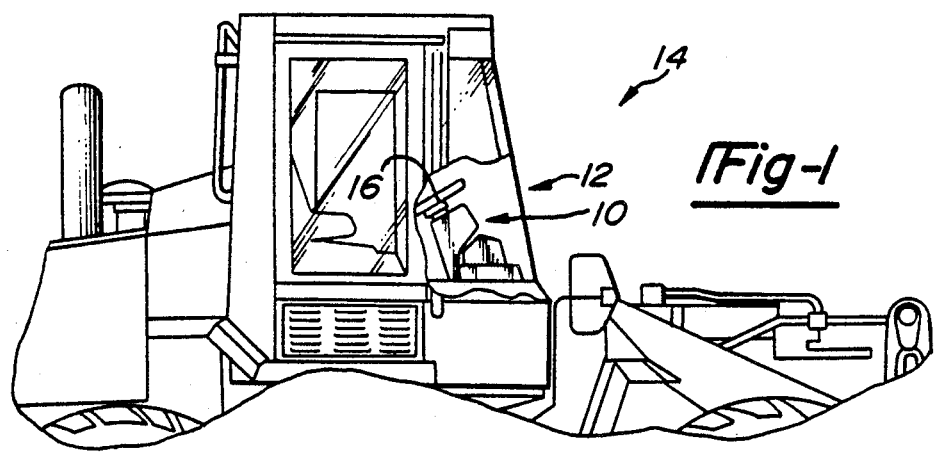
*Fig-1*
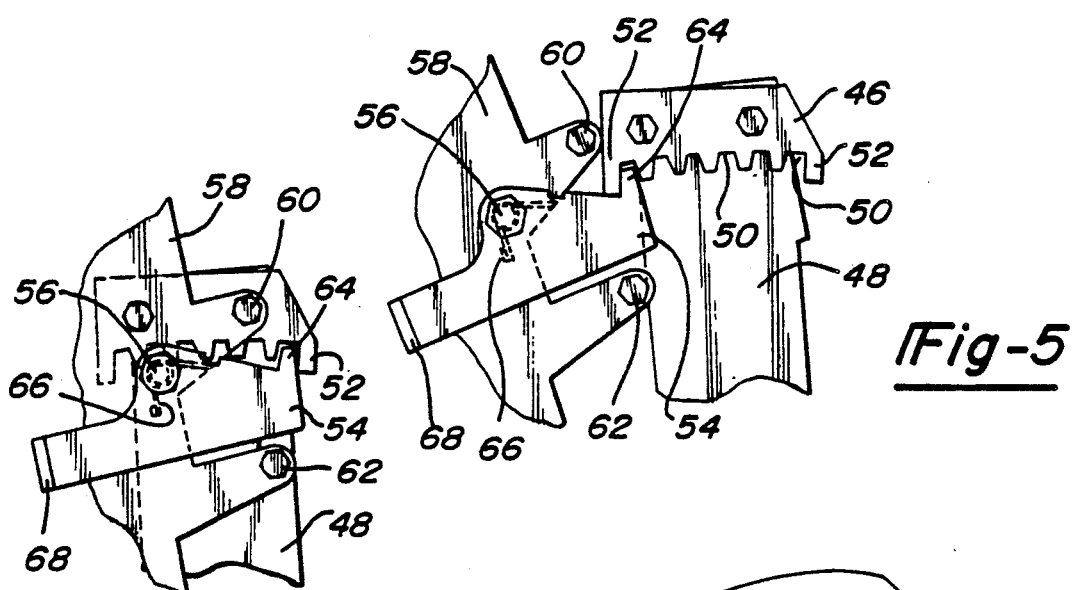
*Fig-5*
*Fig-4*
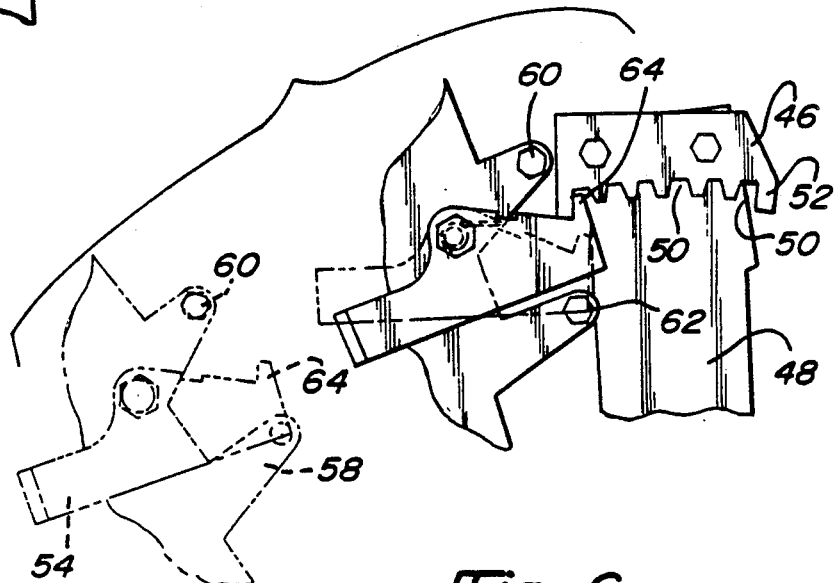
*Fig-6*

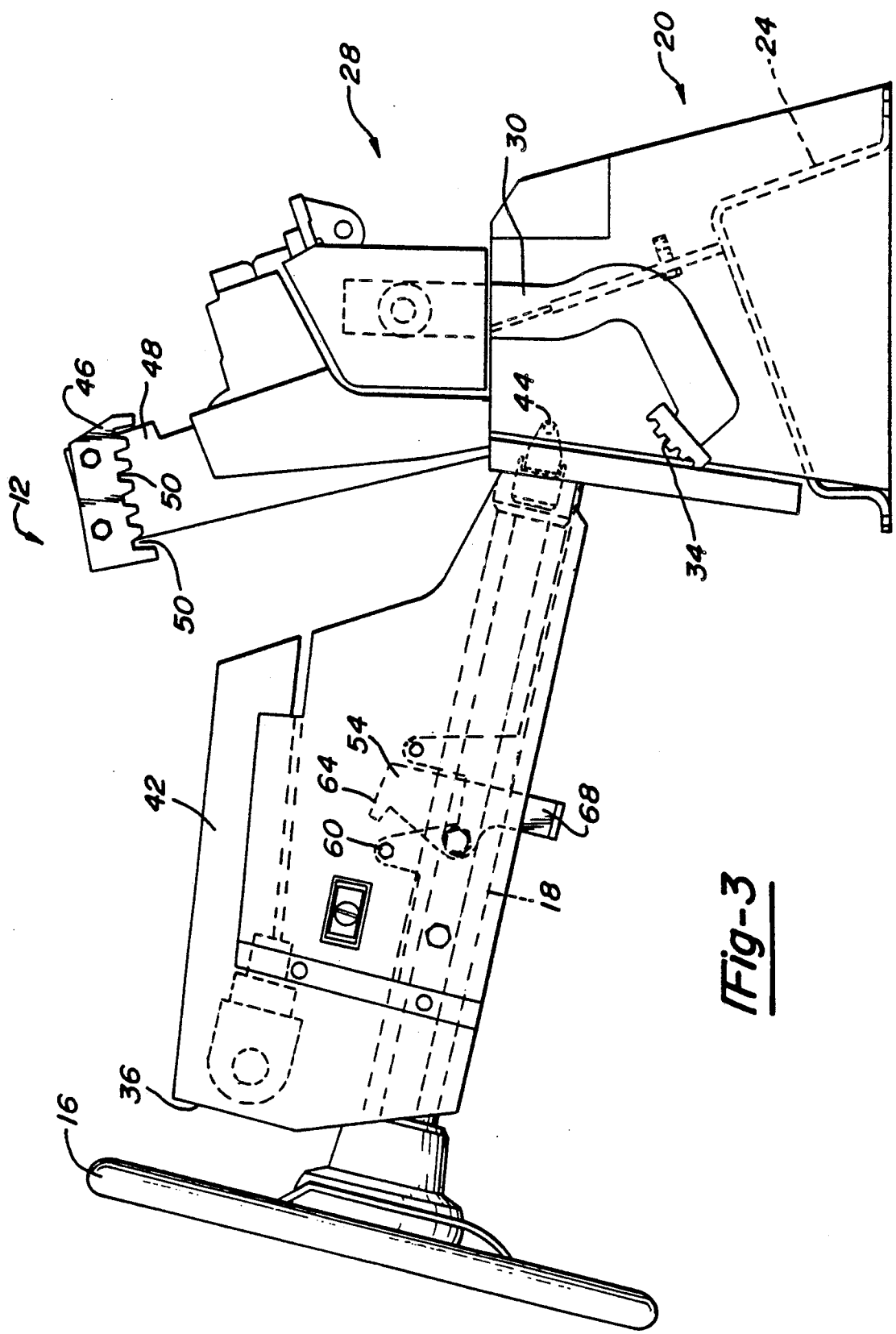

TILT STEERING COLUMN LATCH RELEASE

BACKGROUND OF THE INVENTION

1. Field of the Invention

This invention pertains to steering wheel arrangements for motor vehicles and more particularly to steering wheel arrangements whereby a steering wheel is capable of being tilted to adjust to a comfortable driving position. Still more particularly, the present invention relates to an arrangement by which a steering wheel column is free to move, tilt, or pivot within a range of adjustment bounded by a latch mechanism and whereby the latch mechanism may be moved to release the steering wheel column so that it may be tilted to a position whereat components mounted on the steering wheel column and within its support structure may be serviced.

2. Description of the Prior Art

Heretofore, tilt steering columns have mounted instruments for transmission control, turn signals, flashing controls, and master warning lights. Additionally, the steering column has been associated with framework and support structures that have housed brake valves and brake plumbing. All of these components associated with the steering column are concentrated into a space surrounding the steering column that is difficult to access for servicing the components.

U.S. Pat. No. 2,865,222, issued to B. B. Bachman, discloses a hinged connection between the steering column and the steering wheel to facilitate adjustment of the steering wheel in the most comfortable position for the driver. Bachman's adjustable steering wheel tilts within a limited range of degrees.

U.S. Pat. No. 3,799,569, issued to Baker, also discloses a steering system for a vehicle in which the steering column may be tilted with respect to a fixed axis. The range of tilt appears to be greater than the range taught by Bachman. Neither Bachman nor Baker teach attaching an instrument panel so that it will tilt with the steering wheel column and the wheel itself.

U.S. Pat. No. 4,527,444, issued to McKee et al. discloses a tilt steering wheel arrangement that has a readout instrument panel, with various indicators on it, rigidly attached to and tiltable with the steering column. This arrangement provides a constant angular correlation between the steering wheel and the instrument panel so that the operator has an unobstructed view of the panel in all steering wheel tilt positions. The steering wheel and steering column tilt positions, however, are limited to a range of comfortable driving positions.

SUMMARY OF THE INVENTION

According to the present invention, a motor vehicle tilt steering wheel arrangement has a steering wheel rotatably mounted on a steering column. The steering column is tiltable along with support brackets for mounting an instrument panel, so that the instrument panel is tiltable with the steering column to provide a constant correlation with the steering wheel. Accordingly, an unobstructed view of the panel is provided to the operator when the steering wheel is in the variety of positions to which it is tilted. This affords the operator an unobstructed view of the panel in all tilt positions.

The steering column is stopped in a selected tilt position by the engagement of a tilt latch with a tilt rack. Stops on the tilt latch and rack assembly and an adjustment bolt cooperate to limit the tilt positions of the steering column over a range of comfortable driving positions of the steering wheel. The bolt may be unscrewed so as to allow the tilt latch to over-travel, thereby releasing the steering column to move past the stops and downwardly away from a support structure. In its away position, the steering column does not impede serviceability to the components mounted both on the column and on the support structure for the column.

OBJECTS OF THE INVENTION

Accordingly, it is one object of the present invention to provide a tilt steering wheel and column that has an instrument panel which tilts in correlation with the steering wheel to facilitate an unobstructed view of the instrument panel in all of the steering wheel tilt positions.

It is another object of the present invention to provide a means of housing components associated with and being supported by the steering column, so that they may tilt with the tiltable steering column.

It is yet another object of the present invention to provide a means of ready access to components supported by the steering column and supporting structure associated with the steering column.

Yet still it is an object of the present invention to provide a means of releasing the steering column from its limited range of tilt positions so as to provide access to component parts associated with the steering column and with supporting structure associated with the steering column.

These and other objects of the present invention will be realized in connection with the soon to be disclosed specification and the associated drawings, a brief description of which is as follows:

BRIEF DESCRIPTION OF THE DRAWINGS

FIG. 1 is a partial view of a motor vehicle in which the present invention might be used.

FIG. 3 is a side elevational view of the steering column illustrating the steering column released for servicing the tilt steering assembly.

FIGS. 4–6 are partial view of the tilt latch assembly showing various stages of positions of the latch in engagement with the tilt rack.

DESCRIPTION OF THE PREFERRED EMBODIMENT

Figure 2:
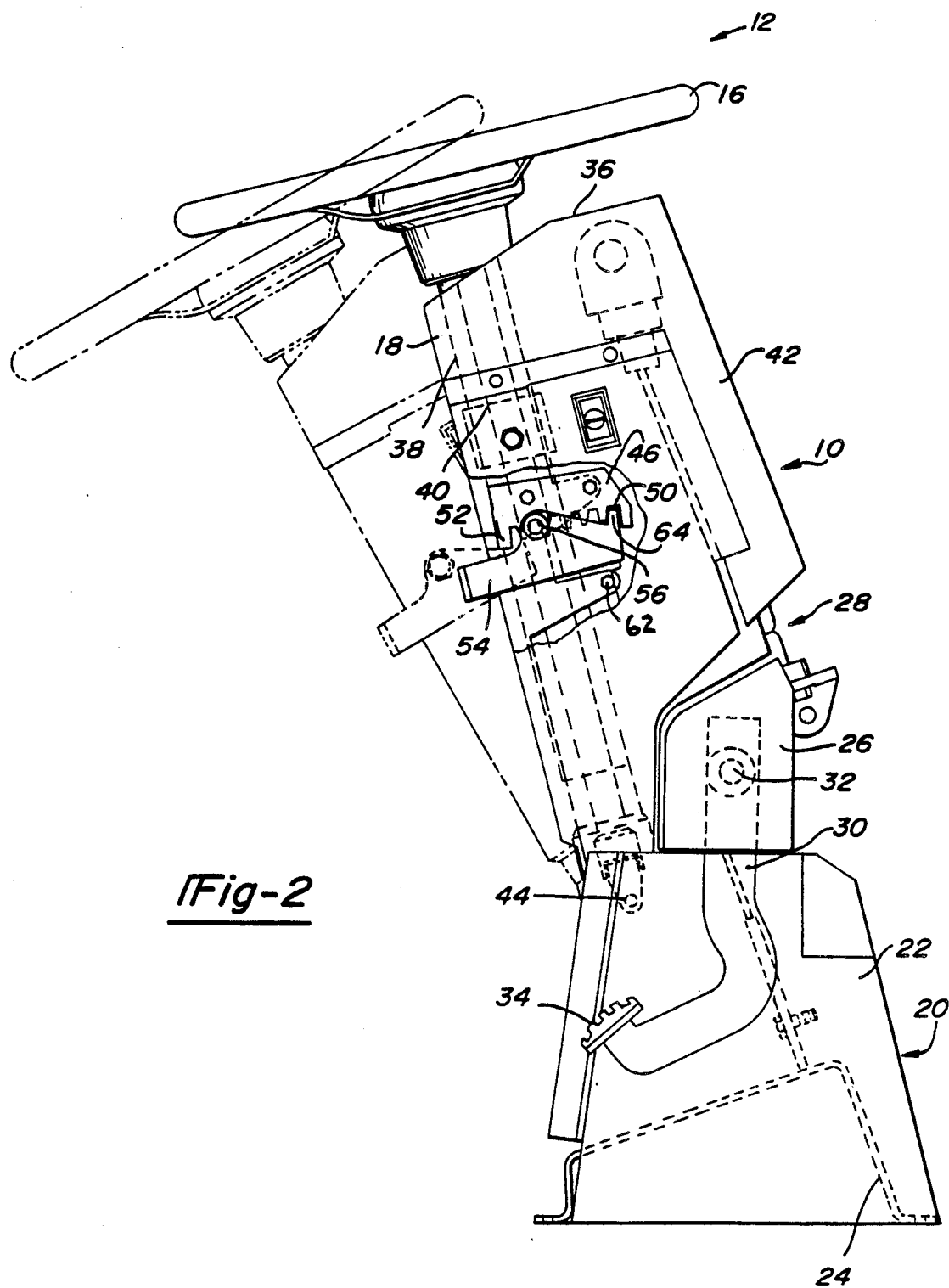
FIG. 2 is a side elevational view of the steering column indicating the tilt latch assembly.

Referring now to the drawings, the reference characters designate like or corresponding parts throughout the several views. Referring first to FIG. 1, a tilt steering column latch release 10, constructed in accordance with the present invention, is a part of a steering system 12 housed in the operator's section 14 of a tractor vehicle.

Referring now to FIG. 2 in addition to FIG. 1, steering system 12 includes a steering wheel 16. Steering wheel 16 is supported by a tilting steering column 18. Steering column 18 is pivotally mounted on a support base 20 formed in part by a pair of brackets 22. Brackets 22 are secured to a generally U-shaped cross brace bracket 24 extending between brackets 22. Cross brace bracket 24 is rigidly attached to the tractor body in the operator section 14. Support base 20 also supports a brake pedal support bracket 26 and a brake valve assembly 28. Brake valve assembly 28 would include brake valve fasteners and hose fittings. A brake pedal linkage bar 30, which pivotally depends from a pivot pin 32 through brake pedal support bracket 26, presents a brake pedal 34 for operation by an operator seated in the operator section 14.

An instrument panel 36 is rigidly secured to a framework (not shown) that is also rigidly secured to the steering column 18 so as to be tiltable therewith. Instrument panel 36 includes display indicators, warning lights, and other functional read-outs, which are not shown. As a result of the structural relationship between the panel 36 and the steering column 18, there is a constant angular correlation between the panel 36 and the steering column 18 so that an operator has an unobstructed view of the instrument panel 36 regardless of the tilt position of the steering wheel 16 and steering column 18.

Steering column 18 consists of inner and outer telescoping members 38 and 40, respectively, which extend within a cover or housing 42. Cover 42 supports steering column 18, for example, by brackets (not shown) attached to cover 42. Accordingly, cover 42 is also tiltable with steering column 18.

The mechanism by which steering column 18 may be tilted to a plurality of tilted positions with the instrument panel 36 will now be explained with respect to the preferred embodiment of the latch release assembly that is the invention, as shown in FIGS. 4–6 as well as FIGS. 1 and 2,.

A fixed horizontal pivot axis, about which steering column 18 and cover 42 tilt, is defined by at least one pin 44 received through cover 42 and the underlying framework not shown. Steering column 18 and cover 42 are held by the latch release assembly 10 in a plurality of pivoted or tilted positions about the axis defined by pin 44. The latch means includes a tilt latch rack 46. Latch rack 46 is positioned on a strut or column 48, shown more particularly in FIGS. 4–6, which is secured to support base 20. Strut 48 extends from support base 20, past the axis defined by pin 44.

Latch rack 46 has a plurality of laterally spaced notches 50. At either end of latch rack 46 are latch rack stops 52, which limit the travel of the tilting steering wheel in a manner to be later described.

The latch means further includes a tilt latch lever 54 that is pivoted intermediate its ends on a bolt 56, carried by a bracket 58 which is attached to the inside of cover 42 by means of bolts 60 and 62. A latch pawl 64 is formed integral with one end of lever 54. A leaf spring 66 is biased around bolt 56 with one end attached to bracket 58 and the other to latch lever 54. Leaf spring 66 urges latch pawl 64 towards latch rack 46 so that latch pawl 64 will automatically move into a notch 50 on latch rack 46 when the associated notch 50 is in alignment with the latch pawl 64. A means for releasing latch pin 64 from an engaged notch 50 is provided by lifting or pushing a free end 68 of latch lever 54 against the bias of leaf spring. 66. Free end 68 is disposed opposite the end on which latch pawl 64 is integrally formed on latch lever 54. This free end 68 is presented through cover 42 to the operator of the motor vehicle.

According to a further aspect of the invention, the tilt of steering column 18 is limited by the generally horizontal travel of latch pawl 64 between notches 50 situated between stops 52 of latch rack 46. Latch pawl 64 cannot override a stop 52, because latch lever 54 cannot pivot so as to clear latch pawl 64 past a stop 52. This is because bolt 62 limits the pivot of latch lever 54 so that there is some vertical overlap between latch pawl 64 and a stop 52. Accordingly, by unscrewing bolt 62, latch lever 54 may be pivoted to override a stop 52 so as to release steering column 18 to tilt to an extreme position, for example, against a seat provided for the operator in the operator's section 14 of the motor vehicle. As shown in FIG. 3, the maximum extreme position exposes the support base 20 for service of its component parts, for example, brake pedal linkage bar 30. Also, in the extreme position, cover 42 may be removed so as to provide access for components parts, such as instrument panel 36 and other components mounted to the tilt steering column 18 and its associated framework.

While the invention is believed to be readily understood by the above description, a brief summary will now be set forth. If it is desired to change the angle of tilt of steering wheel 16 and steering column 18, anywhere between the dotted line and solid line positions shown in FIG. 2, it is only necessary to lift the free end 68 of latch lever 54 to a position intermediate the dotted line and solid line positions of latch lever 54 shown in FIG. 8. The intermediate position will be achieved when latch lever 54 stops against bolt 62, at which time the operator may pivot steering wheel 16 and steering column 18 about the horizontal fixed axis defined by pin 44. When the desired angle of tilt has been reached, the free end 68 of latch lever 54 may be released, and the latch pawl 64 will move into an appropriate notch 50.

If it is desired to service component parts of the tilt steering wheel assembly 12, it is only necessary to unscrew bolt 62 so as to free latch lever 54 to pivot into the dotted position shown in FIG. 6. When latch lever 54 is in the dotted line position shown in FIG. 6, the operator may pivot steering wheel 16 and steering column 18 about the horizontal fixed axis defined by pin 44 to the extreme position shown in FIG. 3, whereat cover 42 may be removed, and the component parts of the steering wheel assembly 12, including the support base 20, may be easily serviced.

We claim:

1. A tilt steering wheel system including a tilt steering column latch release, the steering system comprising:
an elongated steering column having first and second ends;
a base support structure having at least one pin defining a tilt axis, said base support structure mounting said steering column to pivot about said tilt axis;
a steering wheel rotatably mounting said second end of said steering column;
means for pivoting said steering column about said tilt axis to position said steering wheel in a respective one of a plurality of adjusted positions defined by a plurality of radial extensions of said steering column about said pivot axis;
latch means between said steering column and said base support structure for maintaining said steering column in a selected one of said adjusted positions; and
latch release means for releasing said steering column to pivot said steering column to an extreme position remotely away from said adjusted positions;
wherein said support structure includes a strut extending therefrom generally parallel to one of said adjusted positions of said steering column; and
said latch means includes a latch rack attached to one of said steering column and said strut, a latch lever pivotally attached to the other of said steering column and said strut, and a latch pawl attached to and extending generally perpendicular from said latch lever, said latch lever having a pivot travel between positions whereat said latch pawl is engagable with said latch rack to hold said steering column in one of said adjusted positions and positions whereat said latch pin is disengaged from said latch rack to move said steering column to another of said adjusted positions;

wherein said latch rack includes a plurality of notches, said latch pawl being engagable with a respective notch to hold said steering column in one of said adjusted positions;

wherein the latch rack has two opposite ends, said notches being disposed in discrete positions on said latch rack as said latch rack extends between said two ends, said latch rack having an integral stop at each of said two ends;

biasing means attached to said latch lever for biasing said latch lever into engagement with said respective one of said notches, said latch pawl being disengagable by means pivoting said latch lever against said bias;

wherein said latch lever is pivotally attached to the other of said steering column and said strut by a pin connected to one of said steering column and said strut, said latch pawl being located at one end of said latch lever and said latch lever having a free end located at said other end of said latch lever, said means pivoting said latch lever against said bias moving said free end against said bias to release said latch pawl from a respective notch;

wherein said latch rack is rigidly attached to said strut and said latch lever is pivotally connected to said steering column;

wherein said lever is pivotally connected to said steering column by being connected to a cover which is connected to said steering column; and limiting means for limiting said pivot travel of said latch lever, so that said latch pawl will be engagable against one of said integral stops when said latch lever is pivoted to disengage said latch pawl from a notch adjacent said stop.

2. The tilt steering wheel system of claim 1, further comprising a cover attached to said steering column, said cover enclosing an instrument panel, instrumentation, wiring, and components for control devices connected to said steering column, said cover, said instrument panel, said instrumentation, and said components being pivotable with said steering column.

3. The tilt steering wheel system of claim 1, wherein said limiting means is a bolt which said latch lever stops against, said bolt being removable to allow said lever to pivot to a position whereat the latch pin is capable of overriding one of said stops so as to allow the steering column to pivot to an extreme position for servicing components.

4. The tilt steering wheel system of claim 3, wherein said cover is removable from said steering column.

* * * * *